United States Patent [19]

Hessbrüggen et al.

[11] Patent Number: 5,293,793
[45] Date of Patent: Mar. 15, 1994

[54] MACHINING APPARATUS WITH AT LEAST ONE BASE UNIT

[75] Inventors: Norbert Hessbrüggen, Eschenbach; Hans J. Dey, Eislingen; Heinz Steinbach, Ulm, all of Fed. Rep. of Germany

[73] Assignee: EMAG Maschinenfabrik GmbH, Salach, Fed. Rep. of Germany

[21] Appl. No.: 890,275

[22] Filed: May 28, 1992

[30] Foreign Application Priority Data

May 28, 1991 [DE] Fed. Rep. of Germany ....... 4117472

[51] Int. Cl.⁵ .......................... B23B 3/34; B23B 3/00
[52] U.S. Cl. .......................... 82/121; 82/129; 82/137; 82/149
[58] Field of Search ................ 82/120, 121, 129, 132, 82/137, 149, 159

[56] References Cited

U.S. PATENT DOCUMENTS

| | | | |
|---|---|---|---|
| 3,011,373 | 12/1961 | Waldrich | 82/149 |
| 3,643,533 | 2/1972 | Reiners et al. | 82/129 X |
| 3,800,636 | 4/1974 | Zagar | 82/149 |
| 3,974,721 | 8/1976 | Schalles et al. | 82/129 |
| 4,159,660 | 7/1979 | Buckley | 82/129 X |
| 4,700,594 | 10/1982 | Heinen | 82/129 |
| 4,730,373 | 3/1988 | Senoh | 82/129 X |
| 5,117,544 | 6/1992 | Kousaku et al. | 82/129 X |
| 5,182,974 | 2/1993 | Cudini et al. | 82/129 X |

FOREIGN PATENT DOCUMENTS

3834342 10/1988 Fed. Rep. of Germany.

*Primary Examiner*—Timothy V. Eley
*Attorney, Agent, or Firm*—McAulay Fisher Nissen Goldberg & Kiel

[57] ABSTRACT

A lathe comprises at least one base unit which is constructed from two machine beds 4, 7. The machine beds are cast as a one-piece unit from reaction resin concrete and carry the bed guides 5, 8 for a spindle box 6 which is displaceable in the direction of the spindle axis 10 and a tool carrier slide 9 with a tool turret 3. The bed guides are at a right angle relative to one another. Each spindle box comprises a projection 15 which has the length of the displacement path of the spindle box 6 and penetrates through a dividing wall 16 at the front end of the displacement path which is arranged at a right angle to the spindle axis 10. The switching axis 11 of the tool turret 3 is arranged at an angle relative to the longitudinal direction of its bed guide 8. In the construction of a lathe with two spindles the machine beds 4 of the spindle boxes 6 are glued together over a large surface area and the machine beds 7 for the tool carrier slides 9 are arranged at a right angle relative to the latter in a mirror-inverted manner at the machine beds 4.

10 Claims, 4 Drawing Sheets

MACHINING APPARATUS WITH AT LEAST ONE BASE UNIT

BACKGROUND OF THE INVENTION

1. Field Of The Invention

The invention is directed to a lathe having at least one base unit, comprising a drivable tool spindle which is rotatably supported in a spindle box which is displaceable on a machine bed in the direction of the longitudinal axis of the spindle, as well as a tool turret.

2. Scope Of The Prior Art

In a known lathe of this type (DE 38 34 342 A1) the spindle box is displaceable in the direction of two main axes, i.e. in the direction of the spindle axis and transversely relative to the latter, by means of a compound slide system, while the tool carrier is arranged so as to be stationary. This tool carrier comprises two turret heads which are rotatable around axes situated vertically relative to one another, one axis being arranged in the direction of the spindle axis and the other axis being arranged vertically with respect to the spindle axis. This requires a relatively high cost in the construction of the tool carrier. Further a compound slide system is required for the spindle box. It is known that the compound slide system has disadvantages with respect to high precision. Moreover this necessitates a relatively large machine bed on which to arrange the compound slide system with its guides, as well as the stationary tool carrier, which impairs access to the clamping chuck of the tool spindle because of its size. A decisive disadvantage consists in that the chips resulting from the machining of the workpieces fall on the large flat machine bed on which the compound slide system for the spindle box is provided, so that the guides of this compound slide system are impaired by the chips unless costly and trouble-prone protective devices are provided for the guides of the compound slide system. Protective devices for guides in lathes conventionally comprise cover plates which can slide together in the manner of a telescope and overlap one another with corresponding seals. These cover plates are exposed to a high degree of wear because of this telescoping ability and are therefore prone to trouble.

SUMMARY OF THE INVENTION

The object of the invention is to provide a base unit for an extremely compact lathe which is easy to operate and also less prone to problems when a large amount of chips are produced, allows a workpiece to be machined with great precision and provides the precondition for the construction of a two-spindle lathe, the two tool spindles being extensively prevented from influencing one another in the construction of a two-spindle lathe.

This object is met according to the invention, proceeding from a lathe of the type mentioned in the beginning, in that the spindle box has a projection which receives the workpiece spindle, comprises a defining wall extending parallel to the spindle axis, has a length corresponding to the displacement path of the spindle box and penetrates through an opening in a dividing wall, which opening is adapted to the cross section of the projection, the dividing wall being arranged at the front end of the displacement path of the spindle box at a right angle to the workpiece spindle, in that the tool turret is arranged on a tool carrier slide which is displaceable on the machine bed at a right angle relative to the spindle axis, and in that the switching axis of the tool turret is arranged at an angle between 0° and 90°, preferably 45°, relative to its bed guide.

Due to the construction of a sleeve-like projection at the spindle box, which projection receives the tool spindle, and due to the arrangement of a dividing wall through which this projection penetrates when displaced, the bed guide for the spindle box is protected against occurring chips in a simple manner since the stationary dividing wall has no telescoping parts which are susceptible to wear and therefore prone to problems. Due to the arrangement of the bed guides of the spindle box and tool carrier slide at right angles relative to one another in connection with the characteristic feature whereby the switching axis of the tool turret is arranged at an angle between 0° and 90°, preferably 45°, relative to its bed guide, a particularly compact construction is achieved which enables easy accessibility in loading the tool spindle from the front. The precondition for high-precision machining of workpieces is provided since the principle movements are effected on guides which can be executed in a precise manner without the need for compound slides.

The projection can have any desired cross section since it is displaceable together with the spindle box only in the direction of the spindle axis. But it is recommended that the projection have a circular-cylindrical cross section. This results in a simple construction of the projection and opening in the dividing wall.

The construction type of the base unit described above, particularly the right-angle arrangement of the bed guides for the spindle box and the tool carrier slide, furnishes the precondition for a further advantageous construction which consists in that the cover for the bed guide of the tool carrier slide comprises a stationary cover plate and a cover plate which is securely connected with the tool carrier slide and can be slid over the stationary cover plate. Accordingly, the usual telescoping cover which is one of the most trouble-prone parts of a lathe can also be replaced by a simple cover in the bed guide for the tool carrier slide. In a double spindle arrangement, i.e. in a connection of two machine units of the type described here, the cover for the machine beds of the tool carrier slides comprises a central stationary cover plate and a cover plate which is assigned to the respective tool carrier slide, fixedly connected with the latter, and can be slid over the stationary plate. This simple covering of the bed guide for the tool carrier slide further contributes to a design of the apparatus in which it is as unsusceptible as possible with respect to occurring chips with a simple construction of the protective devices.

In a further construction of the invention, the bed guide for the spindle box is constructed as a flat bed guide and the bed guide for the tool carrier slide is constructed as a diagonal bed guide resulting not only in a particularly compact base unit with very good loading facility for the spindle but also in an inclined protective covering for the bed guide of the tool carrier slide which prevents a backup of chips in that the occurring chips slide off onto the simply designed protective cover.

Particularly good preconditions for achieving a high precision in the machining of workpieces are also provided in that the two machine beds are cast as a one-piece unit from reaction resin concrete so as to be at right angles relative to one another because particularly good damping characteristics can be achieved in this way.

Such a base unit furnishes the precondition for providing a lathe with two spindle boxes. In such a construction the machine beds carrying the spindle boxes are glued together over a large surface area. As a result of the substantially L-shaped construction of the base unit, the joining of two such base units results in a lathe with two workpiece spindles which is extremely compact, offers a very good loading facility for the workpiece spindles and moreover extensively eliminates reciprocal influencing of the two workpiece spindles as a result of gluing over a large surface area. A good blocking effect is achieved with respect to the transmission of vibrations from one unit to the other by the glue layer. It is particularly advantageous that the occurrence of chips is also prevented from impairing the bed guides in a two-spindle construction in which two such base units are combined.

A particularly advantageous construction according to the present invention is provided in that, by means of a stepped construction of the machine bed, the diagonal bed guide is formed with horizontal receiving surfaces for the arrangement of the guide strips whose supporting surfaces are arranged horizontally.

This provides for an extremely accurate machining of the bed guide and the production is especially simplified in addition since exactly manufactured guide strips can be arranged on the horizontal receiving surfaces of the machine bed. The simplicity of production and the precision of the arranged guide strips is substantially more advantageous than in the previously known diagonal bed guides with guide strips inclined relative to the latter.

Since every workpiece spindle is constructed as a motor spindle, the space requirement for a base unit is reduced, which is accordingly also true for the two-spindle machine.

A particularly compact construction and a good accessibility and opportunity for observation during machining results when the tool turret is constructed as a crown turret.

BRIEF DESCRIPTION OF THE DRAWINGS

The invention is explained in more detail in the following by means of an embodiment example shown in the drawing.

DESCRIPTION OF THE PREFERRED EMBODIMENTS

Figure 1:
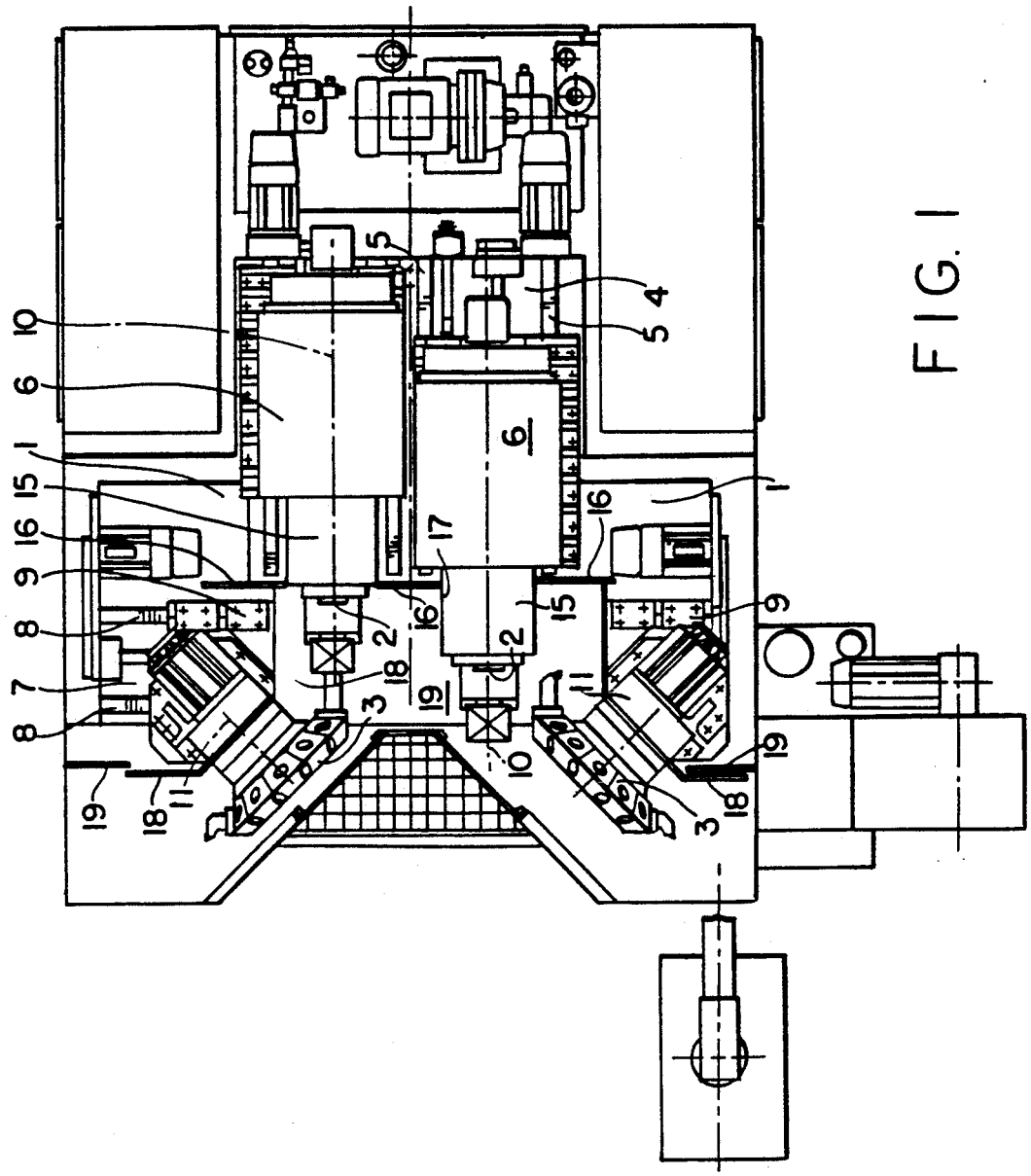
FIG. 1 is a top view of a lathe.

As can be seen in FIG. 1, two base units 1, each having a workpiece spindle 2 and a tool turret 3, are combined to form a two-spindle apparatus. Since the base units are identical, although mirror-inverted, the reference numbers in both units are the same.

Each base unit has a machine bed 4 with a bed guide 5 for a spindle box 6 receiving the workpiece spindle 2 and a machine bed 7 with a bed guide 8 for a tool carrier slide 9 which carries the tool turret 3.

The two machine beds 4 and 7 are constructed in an L-shaped manner, glued together over a large surface area and comprise reaction resin concrete. The respective bed guides 5 and 8 are at a right angle to one another. The spindle box 6 is guided so as to be displaceable in the direction of the spindle axis 10 on the bed guide 5 which is constructed as flat bed guide, while the tool carrier slide 9 is displaceable at a right angle to the spindle axis on the bed guide 8 which is constructed as a diagonal bed guide. The switching axis 11 of the tool turret 3 is at an angle of 45° relative to the spindle axis 10 and to the longitudinal direction of the bed guide 8. The tool turret 3 is constructed as a crown turret so that an extremely compact construction permitting a simple loading of the workpiece spindle 2 from the front results in connection with the diagonally arranged switching axis 11 and the diagonal bed guide for the tool carrier slide 9.

The spindle box 6 is provided with a cylindrical projection 15 which receives the workpiece spindle. The spindle box 6 reaches through a dividing wall 16 with this projection 15, which dividing wall 16 is arranged at a right angle relative to the spindle axis 10 and has an opening 17 corresponding to the cross section of the projection 15. The dividing wall 16 is arranged at the front end of the displacement path of the spindle box 6 so that the bed guide 5 is protected against occurring chips.

Figure 2:
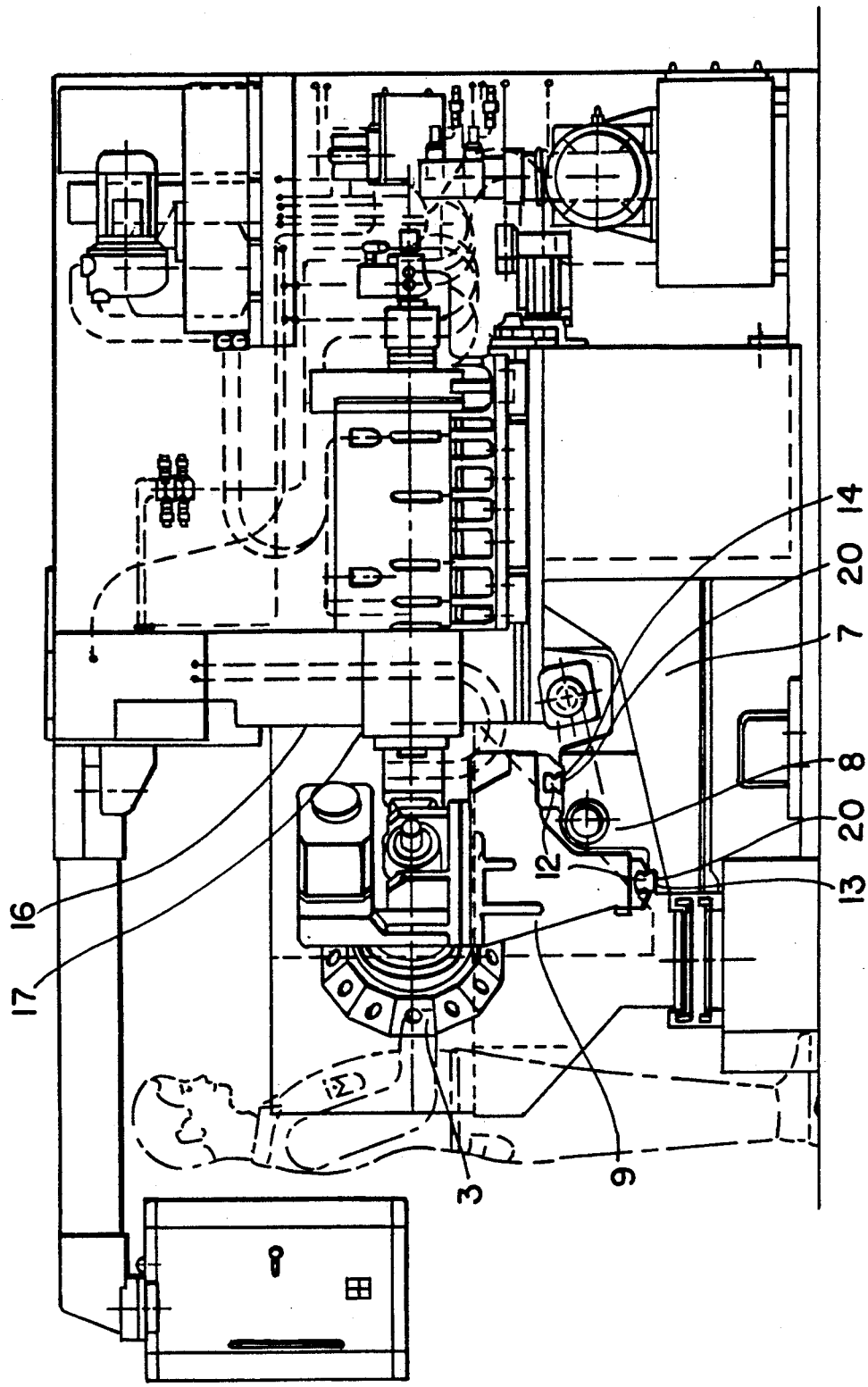
FIG. 2 is a side view of the apparatus according to FIG. 1.
Figure 3:
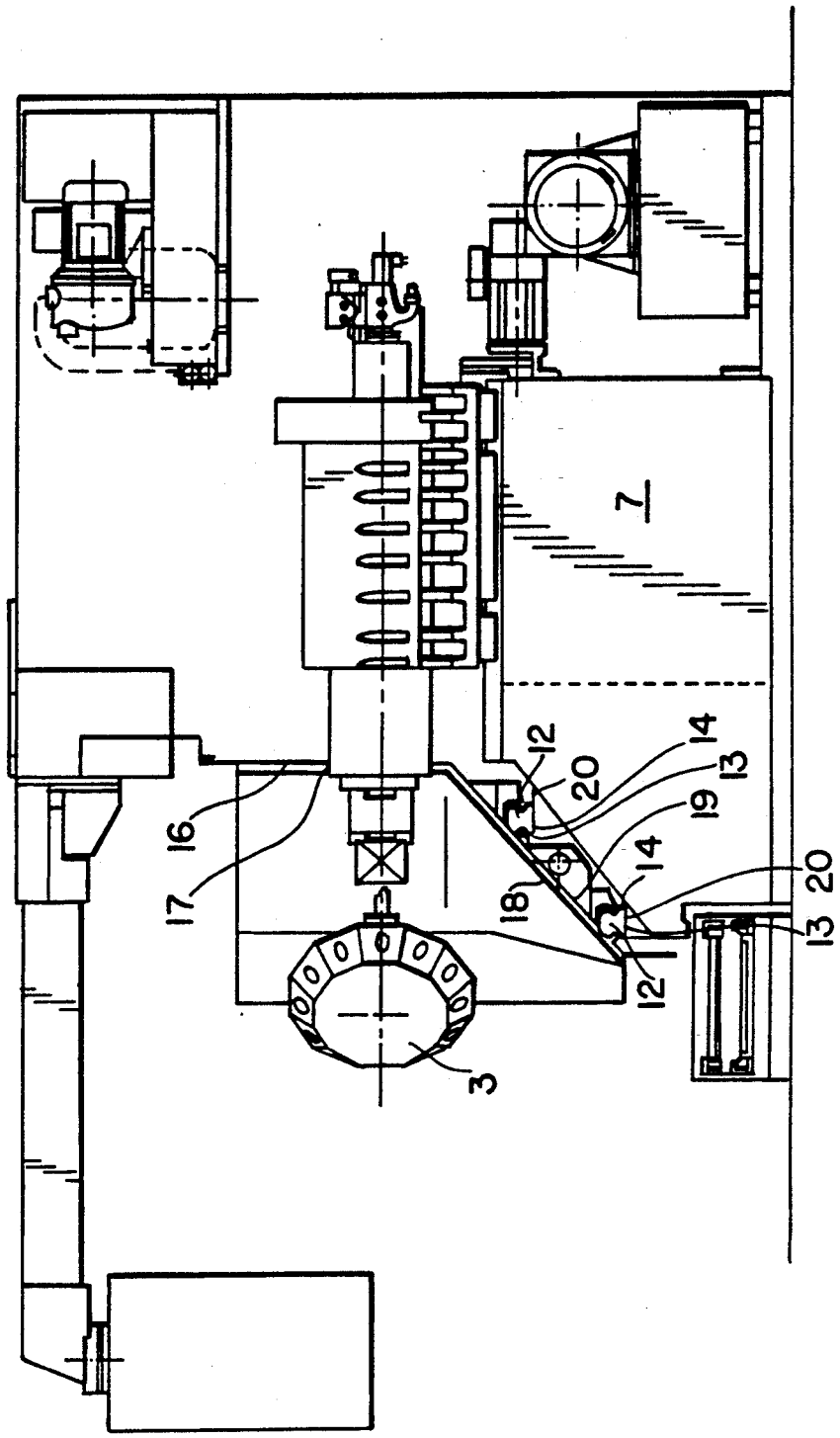
FIG. 3 is a cross-sectional view of FIG. 1 about the line 3—3.
Figure 4:
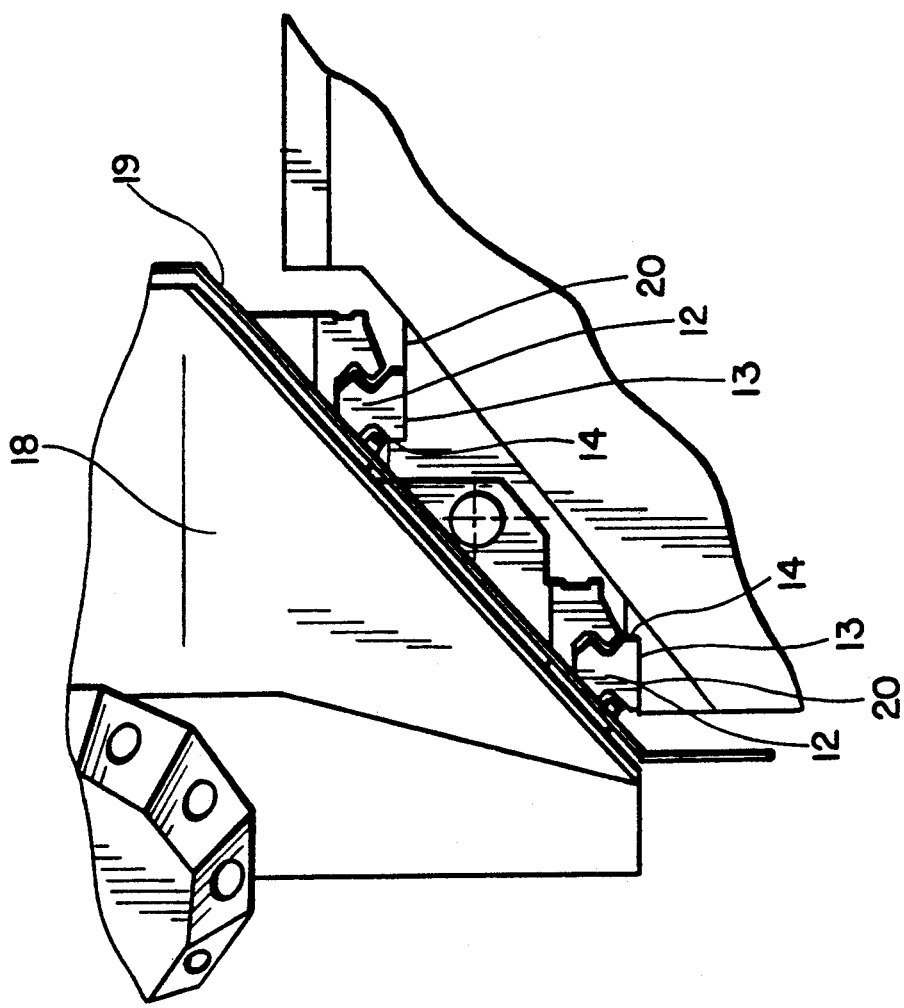
FIG. 4 is a view of detail 4 of FIG. 3.

It can be seen from the view in FIGS. 1 and 2 that the spindle box is relatively short because a motor spindle is installed.

The diagonal bed guide for the tool carrier slide 9 is of a special type because the guide strips 12 of the bed guide 8 are arranged on horizontal receiving surfaces 20 arranged in a stepped manner and have supporting surfaces 13 and guide surfaces 14, which supporting surfaces 13 are arranged horizontally.

This diagonal bed guide has the advantage that it makes possible a simple protective covering for the guides. As can be seen in FIG. 1, every tool carrier slide 9 is provided with a cover plate 18 which is securely connected with the latter and can be displaced over a stationary cover plate 19 so that the protective cover comprises only two parts, namely a stationary cover plate and a cover plate connected with the tool carrier slide.

The production of a two-spindle lathe is simple insofar as two base units 1 are glued together along a large surface area at the machine beds 4 for the spindle box 6. This results in a two-spindle apparatus which proves very compact and has particularly easy access for loading. Since the guides of every base unit are constructed on a separate bed and the base units are glued together over a large surface area, those parts of the apparatus constructed on different base units are prevented from influencing one another to a great extent. Moreover, the precise production of these bed guides is simplified, particularly in their assignment to one another, so that these advantageous characteristics result in an apparatus for the production of precision parts.

What is claimed is:

1. A lathe having at least one base unit, the base unit including a tool turret and a drivable workpiece spindle having a spindle axis, the workpiece spindle being rotatably supported in a spindle box, the spindle box being displaceable on a first machine bed along the spindle axis, the spindle box comprising:
   a) a defining wall extending parallel to the spindle axis; and
   b) a projection for receiving the workpiece spindle, the projection having a cross section and a length greater than or equal to the length of the displacement path, the projection penetrating through an opening in a dividing wall, the opening being adapted to the cross section of the projection, the dividing wall being positioned at an end of the displacement path and at a right angle to the workpiece spindle axis, and, the tool turret having a switching axis and a first bed guide, the tool turret being arranged on a tool carrier slide which is displaceable on a second machine bed at a right angle relative to the spindle axis, the switching axis being arranged at an angle between 0° and 90° relative to the first bed guide.

2. The lathe according to claim 1, wherein that projection has a circular-cylindrical cross section.

3. The lathe according to claim 1, wherein the cover for the bed guide of the tool carrier slide comprises a stationary cover plate and a slidable cover plate, the slidable cover plate being securely connected with the tool carrier slide and slidable over the stationary cover plate.

4. The lathe according to claim 1, wherein the spindle box is displaceable on a second bed guide; the first bed guide being constructed as a diagonal bed guide and the second bed guide being constructed as a flat bed guide.

5. The lathe according to claim 4, wherein the diagonal bed guide is formed by a stepped construction of an apparatus bed with horizontal receiving surfaces for arrangement of guide strips having horizontally arranged supporting surfaces.

6. The lathe according to claim 1, wherein the first and second machine beds are cast as a one-piece unit from reaction resin concrete so as to be at right angles relative to one another.

7. The lathe according to claim 1, wherein two base units are combined, the said first machine beds being glued together over a large surface area and the second machine beds being arranged in a mirror-inverted manner about an axis formed along the large surface area.

8. The lathe according to claim 1, wherein the workpiece spindle is constructed as a motor spindle.

9. The lathe according to claim 1, wherein the tool turret is constructed as a crown turret.

10. The Lathe according to claim 1 wherein said switching axis is arranged at an angle of 45° relative to said first bed guide.

* * * * *